UNITED STATES PATENT OFFICE 2,324,493

PROCESS FOR BREAKING PETROLEUM EMULSIONS

Melvin De Groote, University City, and Bernhard Keiser, Webster Groves, Mo., assignors to Petrolite Corporation, Ltd., Wilmington, Del., a corporation of Delaware No Drawing. Application July 7, 1941, Serial No. 401,381

10 Claims. (Cl. 252—341)

This invention relates primarily to the resolution of petroleum emulsions.

One object of our invention is to provide a novel process for resolving petroleum emulsions of the water-in-oil type, that are commonly referred to as "cut oil," "roily oil," "emulsified oil," etc., and which comprise fine droplets of naturally-occurring waters or brines dispersed in a more or less permanent state throughout the oil which constitutes the continuous phase of the emulsion.

Another object is to provide an economical and rapid process for separating emulsions which have been prepared under controlled conditions, from mineral oil, such as crude petroleum and relatively soft waters or weak brines. Controlled emulsification and subsequent demulsification under the conditions just mentioned is of significant value in removing impurities, particularly inorganic salts, from pipeline oil.

The new chemical compound or composition of matter herein described, and intended to be used as the demulsifier of our process, is exemplified by the acidic, or preferably, neutral ester derived by complete esterification of one mole of a polyalkylene glycol of the kind hereinafter described, with two moles of a fractional ester derived from a hydroxylated material of the kind herein described, and a polybasic carboxy acid having not over six carbon atoms.

If a hydroxylated material, indicated for the sake of convenience by the formula T.OH, is reacted with a polybasic carboxy acid, which, similarly, may conveniently be of the dibasic type and indicated by the formula

HOOC.D.COOH then the fractional ester obtained by reaction between equimolar quantities may be indicated by the following formula:

HOOC.D.COO.T

The polyethylene glycol may be characterized by materials of the kind such as heptaethylene glycol, octaethylene glycol, nonaethylene glycol, decaethylene glycol, to and including heptadecaethylene glycol. For convenience these polyethylene glycols may be indicated by the following formula:

OH($C_2H_4O$)$_m$H 

in which $m$ varies from 7 through 17.

Instead of polyethylene glycols, one may use polypropylene glycols or polybutylene glycols. Thus, for convenience, in the broadest aspect, the polyalkylene glycols employed may be indicated by the following formula:

OH($C_nH_{2n}O$)$_m$H 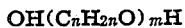

in which $m$ has its previous significance, and $n$ represents a numeral varying from 2 to 4.

Thus, the bulk of the materials herein contemplated may be indicated within certain variations, as hereinafter stated, by the neutral ester derived by esterification of one mole of a glycol of the kind above described, with two moles of a fractional ester of the kind previously described. The formation of the compound may be indicated by the following reaction, although obviously, it is immaterial what particular procedure is employed to produce the particular chemical compound or product:

T.OOC.D.COOH+OH($C_2H_4O$)$_m$H+
HOOC.D.COO.T→
T.OOC.D.COO($C_2H_4O$)$_{m-1}C_2H_4$.OOC.D.COO.T 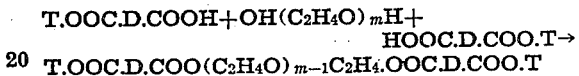

As indicated previously, the polybasic acids employed are limited to the type having not more than six carbon atoms, for example, oxalic, malonic, succinic, glutaris, and adipic. Similarly, one may employ acids such as fumeric, maleic, glutaconic, and various others, including, citric, malic, tartaric, and the like. The selection of the particular tribasic or dibasic acid employed is usually concerned, largely, with convenience of manufacture of the finished ester, and also of the price of the reactants. Generally speaking, the higher the temperature employed, the easier it is to obtain large yields of the esterified product. Although oxalic acid is comparatively cheap, it decomposes somewhat readily at slightly above the boiling point of water. For this reason, it is more desirable to use an acid which is more resistant to pyrolysis. Similarly, when a polybasic acid is available in the form of an anhydride, such anhydride is apt to produce the ester with greater ease than the acid itself. For this reason, maleic anhydride is particularly adaptable; and also, everything else considered, the cost is comparatively low on a per molar basis, even though somewhat higher on a per pound basis. Succinic acid or the anhydride has many of the attractive qualities of maleic anhydride; and this is also true of adipic acid. For purposes of brevity, the bulk of the compounds hereinafter illustrated will refer to the use of maleic anhydride, although it is understood that any other suitable polybasic acid may be employed. Furthermore, for purposes of convenience, reference is made to the use of polyethylene glycols. As has been previously indicated, such glycols can be replaced by suitable polypropylene or polybutylene compounds.

As far as the range of oxyalkylated compounds employed as reactants is concerned, it is our preference to employ those having approximately 8–12 oxyalkylene groups, particularly 8–12 oxyethylene groups. Our preference to use the oxyethylated compounds is due, largely, to the fact that they are commercially available, and particularly so in two desirable forms. The most desirable form is the so-called nonaethylene glycol, which, although consisting largely of nonaethylene glycol, may contain small amounts of heptaethylene and octaethylene glycols, and possibly minor percentages of the higher homologs. Such glycols represent the upper range of distillable glycols; and they may be conveniently referred to as "upper distillable ethylene glycols." There is no particularly good procedure for making a sharper separation on a commercial scale; and it is understood that mixtures of one or more of the glycols may be employed, as well as a single glycol. As pointed out, it is particularly preferred to employ nonaethylene glycol as commercially available, although it is understood that this product contains other homologs, as indicated.

Substantially as desirable as the upper distillable polyethylene glycols, are the lower non-distillable polyethylene glycols. These materials are available in the form of a waxy water-soluble material, and the general range may vary somewhat from deca- to tetradecaethylene glycol. As is well understood, the method of producing such glycols would cause some higher homologs to be formed; and thus, even in this instance, there may be present some oxyethylene glycols within the higher range above indicated. One need not point out that these particular compounds consist of mixtures, and that in some instances, particularly desirable esters are obtained by making mixtures of the liquid nonaethylene glycol with the soft, waxy, lower non-distillable polyethylene glycols. For the sake of convenience, reference in the examples will be to nonaethylene glycol; and calculations will be based on a theoretical molecular weight of 414. Actually, in manufacture, the molecular weight of the glycol employed, whether a higher distillable polyethylene glycol or a lower non-distillable polyethylene glycol, or a mixture of the same, should be determined and reaction conducted on the basis of such determination, particularly in conjunction with the hydroxyl or acetyl value.

It has been previously pointed out that it is immaterial how the compounds herein contemplated are manufactured, although we have found it most desirable to react the selected glycol or mixtures of glycols with maleic anhydride in a ratio of two moles of the anhydride for one mole of the glycol. Under such circumstances, we have found little tendency to form longer chain polymers; and in fact, the product of reaction, if conducted at reasonably low temperatures, appears to be largely monomeric. For convenience, such intermediate fractional ester may then be considered as a dibasic or polybasic acid. One mole of the intermediate fractional ester, so obtained, is then reacted with two moles of the alcoholic material of the kind subsequently described.

It is to be noted, however, that if one prepares a fractional acidic ester, then if two moles of the fractional acidic ester are reacted with one mole of the polyethylene glycol, there is no possibility for the formation of polymeric types of esterification products under ordinary conditions.

The alcoholic bodies employed as reactants in one mode of manufacture of the present compounds are hydroxylated acylated amides containing: (a) an amino nitrogen-linked acyl radical derived from a monocarboxy acid having not more than 5 carbon atoms; (b) an acyl radical derived from a detergent-forming monocarboxy acid having at least 8 and not more than 32 carbon atoms; and (c) an alcoholiform hydroxyl radical.

Detergent-forming acids having at least 8 and not more than 32 carbon atoms are exemplified by fatty acids, naphthenic acids, abietic acids, oxidized paraffin or wax acids, or the like, or by simple modifications thereof which do not detract from the ability of the acid to combine with alkali to produce soap or soap-like materials. As to oxidized petroleum acids, see U. S. Patent No. 2,242,837, dated May 20, 1941, to Shields.

Thus, hydrogenated oleic acid, chlorinated naphthenic acid, or brominated abietic acid will form such detergent-forming bodies with the same ease as the parent materials themselves. The oxidized acids obtained by blowing or oxidation of the acids or esters, are satisfactory. Such acids have frequently been referred to collectively in the art as monocarboxy detergent-forming acids. Needless to say, the acylation need not be conducted by means of the acid iteslf, but may be conducted by means of any compound of the acid which contains the acid radical; for instance, an ester, an amide, an anhydride, an acyl chloride, etc.

It is our preference to use the fatty acids as the most desirable form of a detergent-forming acid, and particularly the unsaturated fatty acids, for instance, ricinoleic acid, oleic acid, mixed fatty acids derived from soyabean oil, rapeseed oil, sesame oil, cottonseed oil, corn oil, peanut oil, and the like. Fatty acids, such as lauric acid, myristic acid, palmitic acid, and the like, may be employed.

The low molal monocarboxy acids having not more than five carbon atoms are exemplified by acetic acid, formic acid, lactic acid, propionic acid, butyric acid, hydrobutyric acid, furoic acid, etc.

In regard to both the detergent-forming acids and in regard to the low molal acids, it is obvious that one need not use the acid itself as a reactant, but may use some suitable derivative, such as the acyl chloride, the anhydride, the ester, or amide; i. e., any suitable form may be used which is the functional equivalent in supplying the acyl radical.

Suitable primary and secondary amines which may be used as primary reactants include the following hydroxylated types: diethanolamine, monoethanolamine, ethyl ethanolamine, methyl ethanolamine, propanolamine, dipropanolamine, propyl propanolamine, etc. Other examples include cyclohexylolamine, dicyclohexylolamine, cyclohexyl ethanolamine, cyclohexyl propanolamine, benzylethanolamine, benzylpropanolamine, pentanolamine, hexanolamine, octylethanolamine, octadecylethanolamine, cyclohexanolethanolamine, etc.

If the low molal monocarboxy acid happens to be hydroxylated, as in the instance of glycolic acid, lactic acid, hydroxybutyric acid, and the like, it is obvious that a hydroxylated detergent-forming acid, for instance, ricinoleic acid, hydroxystearic acid, and the like, could be esterified therewith, i. e., with the hydroxyl group, which is part of the low molal acyl radical; and under such circumstances the primary or secondary amine need not be hydroxylated. Under these circumstances one might employ compounds such as amylamine, diamylamine, butylamine, dibutylamine, benzylamine, cyclohexylamine, etc.

Other suitable types of amines will be described subsequently. For instance, one may employ the type involving the presence of an ether linkage, as, for example, the following:

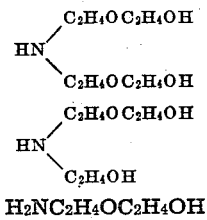

H₂NC₂H₄OC₂H₄OH

Subsequently, reference will be made to U. S. Patent No. 2,238,929, dated April 22, 1941, to Cahn and Harris. Momentarily attention is directed to the numerous amino compounds, particularly secondary hydroxylated amines there described. Such additional amino compounds are suitable as reactants, in view of what will be said subsequently.

Example A, part 1, of the aforementioned Cahn and Harris patent will serve excellently as an initial illustration and is as follows:

"*Example A*

(1) 224 grams of methyl acetate (3 moles) and 210 grams of diethanolamine (2 moles) were mixed together, two layers forming at first, the mixture becoming a homogeneous mass after a short time. The mixture was refluxed for 19 hours, at which time 90% of the diethanolamine had reacted. A portion of the reaction mixture was subjected to a vacuum of 6 millimeters at 60 degrees C. in order to drive off the volatile material, namely, the unreacted methyl acetate and the methyl alcohol which was formed during the reaction. The residue, upon titration, showed a content of 4.64% of free diethanolamine. To 192.5 grams of this residue, 34.7 grams of methyl acetate were added and the mixture was refluxed for 3½ hours. The resulting reaction product was then freed from its low boiling constituents, namely, the methyl alcohol and unreacted methyl acetate, by maintaining the mass at 70 degrees C. under a pressure of 6 millimeters. The residue contained approximately 0.8% of unreacted diethanolamine, based upon a determination of the alkalinity of said residue by titration. The product was a light yellow colored syrup, soluble in water, and contained a compound which was essentially the acetic acid amide of diethanolamine, having the following formula:

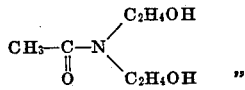"

Having obtained a material of the kind above described, it is obvious that one can then esterify the material with either one or two moles of a detergent-forming monocarboxy acid, so as to obtain a hydroxylated derivative. Obviously, if the detergent-forming acid employed does not contain an alcoholic hydroxyl radical, for instance, if it is of the type other than that exemplified by ricinoleic acid, hydroxystearic acid, and the like, then one can only esterify one mole of such detergent-forming acid with a compound of the kind above described, for the reason that there must be a residual alcoholiform hydroxyl radical. If, however, an acid such as ricinoleic acid, hydroxystearic acid, or the like is employed, then, of course, two moles of such detergent-forming acid can be employed. Similarly, if desired, one might esterify one hydroxyl with oleic acid, and the other hydroxyl with ricinoleic acid.

If the experiment above described is repeated, using monoethanolamine in the equivalent amount, then the final product is characterized by the following formula:

The limitations in regard to the above type of compound is perfectly obvious. Unless one can produce a secondary amide, which is difficult, and generally speaking, not particularly feasible, one must, of necessity, esterify with a hydroxylated detergent-forming acid, such as ricinoleic acid, hydroxystearic acid, or the like.

If, however, instead of using acetic acid, one uses lactic acid or some other hydroxylated low molal carboxy acid, then the two formulas above described change to the following forms:

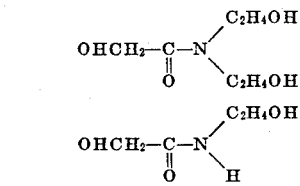

The presence of this additional hydroxyl offers additional opportunity for reaction and further elaboration is not necessary, except perhaps, to point out that even a type of material such as the following:

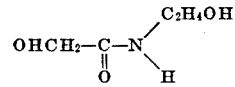

might be employed, provided that ricinoleic acid, for example, is esterified with the hydroxyl of the low molal monocarboxy acid acyl group. Other variants too numerous to mention suggest themselves, as, for example, derivatives of tris (hydroxymethyl) aminomethane or similar types of compounds, such as an amide of the following type which may be used for reaction with a detergent-forming acid:

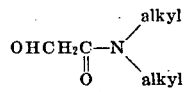

Another suitable raw material is monoglycerylamine, as indicated by the following formula:

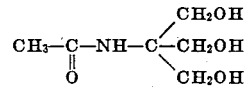

Attention is directed to the aforementioned Cahn and Harris patent, insofar that it illustrates a large number of intermediate products which may be utilized to produce various final compositions of matter, as, for example, sulfated or sulfonated derivatives, as contemplated in said aforementioned U. S. Patent No. 2,238,929. However, the intermediate materials there described obviously can be used as alcoholic bodies in the preparation of compounds of the type herein contemplated. Such materials as there described are largely derivatives of hydroxylated secondary amines; but for the purposes herein contemplated, such limitation does not exist, in view of what has already been said.

By way of illustration, the following examples will serve:

HYDROXYLATED AMIDE TYPE INTERMEDIATE

*Example 1*

One pound mole of an amide of the following formula:

$$CH_3C(=O)-N(H)(C_2H_4OH)$$

is reacted with one pound mole of ricinoleic acid until esterification is complete. Such esterification reaction can be conducted by any one of the conventional means, usually heating at a temperature above the boiling point of water; for instance, 116–160° C. is sufficient. In some cases it may be desirable to pass a dried inert gas through the reacting mass, as, for example, dried carbon dioxide or dried nitrogen. Sometimes the reaction is extended by the presence of a small amount of a sulfonic acid as a catalyst, for instance, ½% of toluene sulfonic acid. In other instances, esterification may be conducted in the presence of an inert solvent, such as xylene, which is permitted to distil off carrying water vapor with it. The vapors are condensed, separation of water and xylene permitted to take place, and the xylene returned to the reacting vessel while the water is diverted to a suitable draw-off connection.

HYDROXYLATED AMIDE TYPE INTERMEDIATE

*Example 2*

51.0 grams (2 moles) of the acetic acid amide of diethanolamine, produced as described in part 1 hereof, and 38.0 grams (1 mol) of lauric acid were heated together for 15 minutes at approximately 200 degrees C., while passing carbon dioxide gas through the reaction mixture. At the end of the 15 minutes, the free lauric acid had decreased to 1.3%. The product was a yellow colored syrup dispersible in water and having good foaming properties. It could be salted out of its solution by the addition thereto of sodium chloride. The product consisted essentially of a compound having the following formula:

$$CH_3-C(=O)-N(C_2H_4OH)(C_2H_4-O-C(=O)-C_{11}H_{23})$$

(The above directions are substantially as they appear in part 2 of example A in the aforementioned Cahn and Harris patent.) Previously, reference has been made to the same patent in regard to the manufacture of the acetic acid amide of diethanolamine, referred to as "part 1 hereof" in the foregoing.

HYDROXYLATED AMIDE TYPE INTERMEDIATE

*Example 3*

The same procedure is followed as in Example 2, except that ricinoleic acid is substituted for lauric acid.

HYDROXYLATED AMIDE TYPE INTERMEDIATE

*Example 4*

The same procedure is followed as in Example 2, except that naphthenic acid is substituted for lauric acid.

HYDROXYLATED AMIDE TYPE INTERMEDIATE

*Example 5*

The same procedure is followed as in Example 2, except that abietic acid is substituted for lauric acid in Example 2.

HYDROXYLATED AMIDE TYPE INTERMEDIATE

*Example 6*

The acetic acid amide of tris (hydroxyethyl) aminomethane, previously described, is substituted for the acetic acid amide of diethanolamine, in Examples 2–5, preceding.

Having obtained hydroxylated acylated amido compounds of the kind previously described, the next step, of course, is to obtain fractional esters derived from nonaethylene glycol of the kind described in the earlier part of the present disclosure. Such materials may be illustrated by the following:

GLYCOL ESTER INTERMEDIATE PRODUCT

*Example 1*

One pound mole of nonaethylene glycol is reacted with two pound moles of maleic anhydride, so as to form nonaethylene glycol dihydrogen dimaleate.

GLYCOL ESTER INTERMEDIATE PRODUCT

*Example 2*

A mixture of lower non-distillable polyethylene glycols, representing approximately deca- to tetradecaethylene glycol, is substituted for nonaethylene glycol in the preceding example.

GLYCOL ESTER INTERMEDIATE PRODUCT

*Example 3*

A 50–50 mixture of nonaethylene glycol and lower non-distillable polyethylene glycols of the kind described in the previous example is substituted for nonaethylene glycol in Example 1.

GLYCOL ESTER INTERMEDIATE PRODUCT

*Example 4*

Adipic acid is substituted for maleic anhydride in Examples 1–3, preceding.

GLYCOL ESTER INTERMEDIATE PRODUCT

*Example 5*

Oxalic acid is substituted for maleic anhydride in Examples 1–3, preceding.

GLYCOL ESTER INTERMEDIATE PRODUCT

*Example 6*

Citric acid is substituted for maleic anhydride in Examples 1–3, preceding.

GLYCOL ESTER INTERMEDIATE PRODUCT

*Example 7*

Succinic anhydride is substituted for maleic anhydride in Examples 1–3, preceding.

The method of producing such fractional esters is well known. The general procedure is to employ a temperature above the boiling point of water and below the pyrolytic point of the reactants. The products are mixed and stirred constantly during the heating and esterification step. If desired, an inert gas, such as dried nitrogen, or dried carbon dioxide, may be passed through the mixture. Sometimes it is desirable to add an esterification catalyst, such as sulfuric acid, benzene sulfonic acid, or the like. This is the same general procedure as employed in the manufacture of ethylene glycol dihydrogen diphthalate. See U. S. Patent No. 2,075,107, dated March 30, 1937, to Frasier.

Sometimes esterification is conducted most readily in the presence of an inert solvent, that carries away the water of esterification which may be formed, although, as is readily appreciated, such water of esterification is absent when the reaction involves an acid anhydride, such as maleic anhydride, and a glycol. However, if water is formed, for instance, when citric acid is employed, then a solvent such as xylene may be present and employed to carry off the water formed. The mixture of xylene vapors and water vapors can be condensed so that the water is separated. The xylene is then returned to the reaction vessel for further circulation. This is a conventional and well known procedure and requires no further elaboration.

COMPOSITION OF MATTER

Example 1

Two pound moles of a material of the kind exemplified by Hydroxylated amide type intermediate, Example 1, preceding, are reacted with one pound mole of a glycol ester intermediate product of the kind described under Glycol ester intermediate products, Examples 1, 2 and 3, preceding. Such reaction is continued until substantially all carboxyl acidity has disappeared. The time of reaction may vary from a few hours to as many as 20 hours.

COMPOSITION OF MATTER

Example 2

The some procedure is followed as in Composition of matter, Example 1, except that one employs a hydroxylated amide type intermediate product described in Hydroxylated amide type intermediate, Example 2, preceding, instead of in Example 1.

COMPOSITION OF MATTER

Example 3

The same procedure is followed as in Composition of matter, Example 1, except that one employs a material of the kind described in Hydroxylated amide type intermediate, Example 3, preceding, instead of in Example 1.

COMPOSITION OF MATTER

Example 4

The same procedure is followed as in Composition of matter, Example 1, except that one employs a material of the kind described in Hydroxylated amide type intermediate, Example 4, preceding, instead of in Example 1.

COMPOSITION OF MATTER

Example 5

The same procedure is followed as in Composition of matter, Example 1, except that one employs a material of the kind described in Hydroxylated amide type intermediate, Example 5, preceding, instead of in Example 1.

COMPOSITION OF MATTER

Example 6

The same procedure is followed as in Composition of matter, Example 1, except that one employs a material of the kind described in Hydroxylated amide type intermediate, Example 6, preceding, instead of in Example 1.

COMPOSITION OF MATTER

Example 7

Glycol ester intermediate products of the kind exemplified by Examples 4–7, preceding, are substituted for Glycol intermediate products, Examples 1, 2 and 3, in the preceding 6 examples.

In such previous examples, which include the use of ricinoleic acid, attention is directed to the fact that excellent products of unusual value are obtainable by substituting oxyalkylated ricinoleic acid, particularly oxyethylated ricinoleic acid, in place of ricinoleic acid. The preparation of such material is well known and preferably involves the following procedure:

Triricinolein in the form of castor oil is treated with 3–12 moles of ethylene oxide for each mole of triricinolein. One-half of 1% of sodium stearate or sodium ricinoleate is used as a catalyst. A temperature of 100–200° C. is employed. The reaction is conducted varying from 100 lbs. to 300 lbs. gauge pressure. The water-insoluble oxyethylated triricinolein so obtained is saponified so as to yield a water-insoluble oxyethylated ricinoleic acid, or one which at the most is self-emulsifying.

Reviewing what has been said, it is obvious that a wide range in carbon atom content exists in regard to the alcoholic bodies employed for reaction with the glycol dihydrogen diacid ester. This may be illustrated by considering two examples. If hydroxyacetic acid is reacted with ethylamine or acetic acid with monoethanolamine, the compound so obtained contains 4 carbon atoms; and after reaction with octanoic acid, the alcoholic body contains a total of 12 carbon atoms. On the other hand, the product derived from acetic acid and diethanolamine has 6 carbon atoms, and one can introduce two ricinoleyl radicals, adding 36 more carbon atoms. Indeed, other similar derivatives suggest themselves, whereby three ricinoleyl radicals are introduced, thus adding 54 carbon atoms. The upper carbon atom limit then approximates 60 carbon atoms, or 70 carbon atoms.

It is to be noted that this second step is an esterification reaction, and the same procedure is employed as suggested above in the preparation of the intermediate product. Needless to say, any particular method may be used to produce the desired compounds of the kind indicated. In some instances it may be desirable to conduct the esterification reaction in the presence of a non-volatile inert solvent which simply acts as a diluent or viscosity reducer.

In the preceding examples, attention has been directed primarily to the monomeric form, or at least, to the form in which the bifunctional alcohol, i. e., a glycol, and the polyfunctional acid, usually a bifunctional compound, react to give a chain type compound, in which the adjacent acid and glycol nucleus occur as a structural unit. For instance, in the monomeric form this may be indicated in the following manner:

acid .... glycol .... acid

If, however, one prepared an intermediate product employing the ratio of three moles of maleic anhydride and two moles of nonaethylene glycol, the tendency would be to produce a product which might be indicated in the following manner:

acid . . . glycol . . . acid . . . glycol . . . acid

Similarly, three moles of the glycol and four moles of the acid might tend to give a combination which may be indicated thus:

acid . . . glycol . . . acid . . . glycol . . .
                           acid . . . glycol . . . acid Another way of stating the matter is that the composition may be indicated in the following manner:

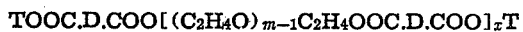

in which the characters have their previous significance and $x$ is a relatively small whole number less than 10 and probably less than 5; and in the monomeric form $x$, of course, is 1. The limitations on the size of $x$ are probably influenced, largely, by the fact that reaction leading to further growth is dependent upon random contact.

Some of the products are self-emulsifiable oils, or self-emulsifiable compounds; whereas, others give cloudy solutions or sols; and the most desirable type is characterized by giving a clear solution in water, and usually in the presence of soluble calcium or magnesium salts, and frequently, in the presence of significant amounts of either acids or alkalies.

Water solubility can be enhanced in a number of ways which have been suggested by previous manufacturing directions, for instance:

(a) By using a more highly polymerized ethylene glycol;

(b) By using a polymeric form instead of a monomeric form in regard to the unit which forms the chain between the two alcoholic nuclei;

(c) By using a polybasic carboxy acid of lower molecular weight, for instance, maleic acid instead of adipic acid; and (d) By using an alcoholic reactant of lower molecular weight, or one having more hydroxyl groups, or possibly, having one or more ether groups.

Indeed, in many instances the hydroxylated body may show some tendency towards water solubility or self-emulsification prior to reaction with a glycol ester. It is to be noted in this instance that the hydroxylated materials which are employed prior to reaction with the gylcol ester are largely of the water-insoluble type, but in such instances where they are self-emulsifiable or show hydrophile properties, they are equally suitable.

Actually, a reaction involving an alcohol and an acid (esterification) may permit small amounts of either one or both of the reactants, depending upon the predetermined proportion, to remain in an unreacted state. In the actual preparation of compositions of the kind herein contemplated, any residual acidity can be removed by any suitable base, for instance, ammonia, triethanolamine, or the like, especially in dilute solution. Naturally, precaution should be taken, so that neutralization takes place without saponification or decomposition of the ester. In some cases there is no objection to the presence of the acidic group. Indeed, if a tribasic acid be employed in such a manner as to leave one free carboxyl group, then it is usually desirable to neutralize such group by means of a suitable basic material.

In the heretofore appended claims, reference to a neutral product refers to one in which free carboxylic radicals are absent.

Conventional demulsifying agents employed in the treatment of oil field emulsions are used as such, or after dilution with any suitable solvent, such as water; petroleum hydrocarbons, such as gasoline, kerosene, stove oil, a coal tar product, such as benzene, toluene, xylene, tar acid oil, cresol, anthracene oil, etc. Alcohols, particularly aliphatic alcohols, such as methyl alcohol, ethyl alcohol, denatured alcohol, propyl alcohol, butyl alcohol, hexyl alcohol, octyl alcohol, etc., may be employed as diluents. Miscellaneous solvents, such as pine oil, carbon tetrachloride, sulfur dioxide extract obtained in the refining of petroleum, etc., may be employed as diluents. Similarly, the material or materials herein described may be admixed with one or more of the solvents customarily used in connection with conventional demulsifying agents, provided that such compounds are compatible. They will be compatible with the hydrophile type of solvent in all instances. Moreover, said material or materials may be used alone, or in admixture with other suitable well known classes of demulsifying agents.

It is well known that conventional demulsifying agents may be used in a water-soluble form, or in an oil-soluble form, or in a form exhibiting both oil and water solubility. Sometimes they may be used in a form which exhibits relatively limited oil solubility. However, since such reagents are sometimes used in a ratio of 1 to 10,000, or 1 to 20,000, or even 1 to 30,000, such an apparent insolubility in oil and water is not significant, because said reagents undoubtedly have solubility within the concentration employed. This same fact is true in regard to the material or materials herein described, except that they are invariably water-soluble.

We desire to point out that the superiority of the reagent or demulsifying agent contemplated in our herein described process for breaking petroleum emulsions, is based upon its ability to treat certain emulsions more advantageously and at a somewhat lower cost than is possible with other available demulsifiers, or convent'onal mixtures thereof. It is believed that the particular demulsifying agent or treating agent herein described will find comparatively limited application, so far as the majority of oil field emulsions are concerned; but we have found that such a demulsifying agent has commercial value, as it will economically break or resolve oil field emulsions in a number of cases which cannot be treated as easily or at so low a cost with the demulsifying agents heretofore available.

In practising our improved process for resolving petroleum emulsions of the water-in-oil type, a treating agent or demulsifying agent of the kind above described is brought into contact with or caused to act upon the emulsion to be treated, in any of the various ways, or by any of the various apparatus now generally used to resolve or break petroleum emulsions with a chemical reagent, the above procedure being used either alone, or in combination with other demulsifying procedure, such as the electrical dehydration process.

The demulsifier herein contemplated may be employed in connection with what is commonly known as down-the-hole procedure, i. e., bringing the demulsifier in contact with the fluids of the well at the bottom of the well, or at some point prior to their emergence. This particular type of application is decidedly feasible when the demulsifier is used in connection with acidification of calcareous oil-bearing strata, especially if suspended in or dissolved in the acid employed for acidification.

It will be apparent to those skilled in the art that residual carboxyl acidity can be eliminated by esterification with a low molal alcohol, for instance, ethyl, methyl, or propyl alcohol, by conventional procedure, so as to give a substantially neutral product. The introduction of such low molal hydrophobe groups does not seriously affect the solubility, and in some instances, gives increased resistance, to soluble calcium and magnesium salts, for such property is of particular value. Usually, however, neutralization with a dilute solution of ammonia or the like is just as practicable and less expensive.

In the hereto appended claims it is intended that the monomeric forms contemplate also the polymeric forms, insofar that the polymeric forms are nothing more or less than a repetition of the monomeric forms several times over, with the loss of one or more moles of water.

Having thus described our invention, what we claim as new and desire to secure by Letters Patent is:

1. A process for breaking petroleum emulsions of the water-in-oil type, characterized by subjecting the emulsion to the action of a demulsifying agent comprising a water-soluble esterification product, derived by reaction between one mole of a polybasic compound and two moles of a hydroxylated acylated amide; the polybasic compound being the esterification product of (A) a polyalkylene glycol having at least 7 and not more than 17 ether linkages, and the alkylene radical thereof containing at least 2 and not more than 6 carbon atoms; and (B) a polybasic carboxy acid having not more than 6 carbon atoms; and the ratio of the esterifying reactants being within the range of more than 1 and not over 2 moles of the polybasic acid for each mole of the glycol; said hydroxylated acylated amide containing: (a) an amino nitrogen-linked acyl radical derived from a monocarboxy acid having not more than 5 carbon atoms; (b) an acyl radical derived from a detergent-forming monocarboxy acid having at least 8 and not more than 32 carbon atoms; and (c) an alcoholiform hydroxyl radical.

2. A process for breaking petroleum emulsions of the water-in-oil type, characterized by subjecting the emulsion to the action of a demulsifying agent comprising a neutral, water-soluble esterification product, derived by reaction between one mole of a polybasic compound and two moles of a hydroxylated acylated amide; the polybasic compound being the esterification product of (A) a polyalkylene glycol having at least 7 and not more than 17 ether linkages, and the alkylene radical thereof containing at least 2 and not more than 6 carbon atoms; and (B) a polybasic carboxy acid having not more than 6 carbon atoms; and the ratio of the esterifying reactants being within the range of more than 1 and not over 2 moles of the polybasic acid for for each mole of the glycol; said hydroxylated acylated amide containing: (a) an amino nitrogen-linked acyl radical derived from a monocarboxy acid having not more than 5 carbon atoms; (b) an acyl radical derived from a detergent-forming monocarboxy acid having at least 8 and not more than 32 carbon atoms; and (c) an alcoholiform hydroxyl radical.

3. A process for breaking petroleum emulsions of the water-in-oil type, characterized by subjecting the emulsion to the action of a demulsifying agent comprising a neutral, water-soluble esterification product, derived by reaction between one mole of a dibasic compound and two moles of a hydroxylated acylated amide; the dibasic compound being the esterification product of (A) a polyalkylene glycol having at least 7 and not more than 17 ether linkages, and the alkylene radical thereof containing at least 2 and not more than 6 carbon atoms; and (B) a dibasic carboxy acid having not more than 6 carbon atoms; and the ratio of the esterifying reactants being within the range of more than 1 and not over 2 moles of the polybasic acid for each mole of the glycol; said hydroxylated acylated amide containing: (a) an amino nitrogen-linked acyl radical derived from a monocarboxy acid having not more than 5 carbon atoms; (b) an acyl radical derived from a detergent-forming monocarboxy acid having at least 8 and not more than 32 carbon atoms; and (c) an alcoholiform hydroxyl radical.

4. A process for breaking petroleum emulsions of the water-in-oil type, characterized by subjecting the emulsion to the action of a demulsifying agent comprising a neutral, water-soluble esterification product, derived by reaction between one mole of a dibasic compound and two moles of a hydroxylated acylated amide; the dibasic compound being the esterification product of (A) a polyalkylene glycol having at least 7 and not more than 17 ether linkages, and the alkylene radical thereof containing at least 2 and not more than 4 carbon atoms; and (B) a dibasic carboxy acid having not more than 6 carbon atoms; and the ratio of the esterifying reactants being within the range of more than 1 and not over 2 moles of the polybasic acid for each mole of the glycol; said hydroxylated acylated amide containing: (a) an amino nitrogen-linked acyl radical derived from a monocarboxy acid having not more than 5 carbon atoms; (b) an acyl radical derived from a detergent-forming monocarboxy acid having at least 8 and not more than 32 carbon atoms; and (c) an alcoholiform hydroxyl radical.

5. A process for breaking petroleum emulsions of the water-in-oil type, characterized by subjecting the emulsion to the action of a demulsifying agent comprising a neutral, water-soluble esterification product, derived by reaction between one mole of a dibasic compound and two moles of a hydroxylated acylated amide; the dibasic compound being the esterification product of (A) a polyethylene glycol having at least 7 and not more than 17 ether linkages; and (B) a dibasic carboxy acid having not more than 6 carbon atoms; and the ratio of the esterifying reactants being within the range of more than one and not over two moles of the dibasic acid for each mole of the glycol; and said hydroxylated acylated amide containing: (a) an amino nitrogen-linked acyl radical derived from a monocarboxy acid having not more than 5 carbon atoms; (b) an acyl radical derived from a detergent-forming monocarboxy acid having at least 8 and not more than 32 carbon atoms; and (c) an alcoholiform hydroxyl radical.

6. A process for breaking petroleum emulsions of the water-in-oil type, characterized by subjecting the emulsion to the action of a demulsifying agent comprising a neutral, water-soluble chemical compound of the following formula type:

TOOC.D.COO[(C$_2$H$_4$O)$_m$C$_2$H$_4$OOC.D.COO]$_x$T in which T is a radical derived by dehydroxylation of a hydroxylated acylated amide containing: (a) an amino nitrogen-linked acyl radical derived from a monocarboxy acid having not more than 5 carbon atoms; (b) an acyl radical derived from a detergent-forming monocarboxy acid having at least 8 and not more than 32 carbon atoms; and (c) an alcoholiform hydroxyl radical; OOC.D.COO is the acid radical derived from a dibasic acid by removal of the acidic hydrogen atoms; said acid radical having not over 6 carbon atoms; $m$ represents a numeral varying from 7 to 12; and $x$ is a small whole number less than 10.

7. A process for breaking petroleum emulsions of the water-in-oil type, characterized by subjecting the emulsion to the action of a demulsifying agent comprising a neutral, water-soluble chemical compound of the following formula type:

TOOC.D.COO(C$_2$H$_4$O)$_m$C$_2$H$_4$OOC.D.COO.T in which T is a radical derived by dehydroxylation of a hydroxylated acylated amide containing: (a) an amino nitrogen-linked acyl radical derived from a monocarboxy acid having not more than 5 carbon atoms; (b) an acyl radical derived from a detergent-forming monocarboxy acid having at least 8 and not more than 32 carbon atoms; and (c) an alcoholiform hydroxyl radical; OOC.D.COO is the acid radical derived from a dibasic acid by removal of the acidic hydrogen atoms; said acid radical having not over 6 carbon atoms; and $m$ represents a numeral varying from 7 to 12.

8. A process for breaking petroleum emulsions of the water-in-oil type, characterized by subjecting the emulsion to the action of a demulsifying agent comprising a neutral, water-soluble chemical compound of the following formula type:

TOOC.D.COO(C$_2$H$_4$O)$_m$C$_2$H$_4$OOC.D.COO.T in which T is a radical derived by dehydroxylation of a hydroxylated acylated amide containing: (a) an amino nitrogen-linked acyl radical derived from a monocarboxy acid having not more than 5 carbon atoms; (b) an acyl radical derived from a detergent-forming monocarboxy acid having at least 8 and not more than 32 carbon atoms; and (c) an alcoholiform hydroxyl radical; OOC.D.COO is the acid radical derived from maleic acid by removal of the acidic hydrogen atoms; and $m$ represents a numeral varying from 7 to 12.

9. A process for breaking petroleum emulsions of the water-in-oil type, characterized by subjecting the emulsion to the action of a demulsifying agent comprising a neutral, water-soluble chemical compound of the following formula type:

TOOC.D.COO(C$_2$H$_4$O)$_m$C$_2$H$_4$OOC.D.COO.T in which T is a radical derived by dehydroxylation of a hydroxylated acylated amide containing: (a) an amino nitrogen-linked acyl radical derived from a monocarboxy acid having not more than 5 carbon atoms; (b) an acyl radical derived from a detergent-forming monocarboxy acid having at least 8 and not more than 32 carbon atoms; and (c) an alcoholiform hydroxyl radical; OOC.D.COO is the acid radical derived from succinic acid by removal of the acidic hydrogen atoms; and $m$ represents a numeral varying from 7 to 12.

10. A process for breaking petroleum emulsions of the water-in-oil type, characterized by subjecting the emulsion to the action of a demulsifying agent comprising a neutral, water-soluble chemical compound of the following formula type:

TOOC.D.COO(C$_2$H$_4$O)$_m$C$_2$H$_4$OOC.D.COO.T in which T is a radical derived by dehydroxylation of a hydroxylated acylated amide containing: (a) an amino nitrogen-linked acyl radical derived from a monocarboxy acid having not more than 5 carbon atoms; (b) an acyl radical derived from a detergent-forming monocarboxy acid having at least 8 and not more than 32 carbon atoms; and (c) an alcoholiform hydroxyl radical; OOC.D.COO is the acid radical derived from adipic acid by removal of the acidic hydrogen atoms; and $m$ represents a numeral varying from 7 to 12.

MELVIN DE GROOTE.
BERNHARD KEISER.